United States Patent
Barringer

(10) Patent No.: US 7,221,164 B1
(45) Date of Patent: May 22, 2007

(54) AIRBORNE REMOTE SENSING ELECTRIC FIELD EXPLORATION SYSTEM

(76) Inventor: Anthony R. Barringer, 25060 Montane Dr. W., Golden, CO (US) 80601

( * ) Notice: Subject to any disclaimer, the term of this patent is extended or adjusted under 35 U.S.C. 154(b) by 0 days.

(21) Appl. No.: 11/409,691

(22) Filed: Apr. 25, 2006

(51) Int. Cl.
*G01B 7/06* (2006.01)
*G01R 33/02* (2006.01)

(52) U.S. Cl. ...................... 324/330; 324/350
(58) Field of Classification Search ............... 324/330, 324/331, 348, 349, 350
See application file for complete search history.

(56) References Cited

U.S. PATENT DOCUMENTS

| | | | | |
|---|---|---|---|---|
| 3,872,375 | A * | 3/1975 | Ronka | 324/330 |
| 6,765,383 | B1 * | 7/2004 | Barringer | 324/330 |
| 7,002,349 | B2 * | 2/2006 | Barringer | 324/330 |

* cited by examiner

*Primary Examiner*—Edward Lefkowitz
*Assistant Examiner*—David M. Schindler
(74) *Attorney, Agent, or Firm*—Edwin H. Crabtree; Ramon L. Pizarro

(57) ABSTRACT

An airborne exploration system used with an aircraft for exploration of oil and gas, mineral deposits and aquifers. The survey system uses natural electromagnetic EM fields as an energy source. The exploration system includes at least one non-directional, wideband, total electric field, water sensor. The water sensor includes a water container filled with water and adapted for mounting on an aircraft. The water container has a pair of conductive metal bands mounted around opposite ends thereof. The metal bands provide a capacitive electrical coupling with the water in the container. The water container has a diameter substantial the size as a length of the container. Therefore, the sensor responds to an electric field substantially independent of the relative orientation of the electric field. The bands are electrically connected to a computer data processing unit mounted on the aircraft. The data processing unit is used for receiving and processing valuable and anomalous electric field data from the water sensor when flying over a potential oil, gas or mineral prospect.

13 Claims, 2 Drawing Sheets

AIRBORNE REMOTE SENSING ELECTRIC FIELD EXPLORATION SYSTEM

BACKGROUND OF THE INVENTION (a) Field of the Invention

The subject invention relates to an airborne survey aircraft for recording electric fields generated in the ground by a flow of telluric currents and more particularly, but not by way of limitation, to a non-contact, airborne, remote sensing electric field exploration system for exploration of oil and gas and mineral deposits using the telluric currents as an energy source.

(b) Discussion of the Prior Art

The subject invention is based on the presences within the earth's crust of high amplitude, low frequency, telluric currents. These currents are induced into the earth by similar high amplitude, low frequency, magnetelluric fields. The telluric currents originate from an interaction between charged particles in the solar wind with the earth's magnetic fields. These effects are described in more detail in various geophysical literature and in U.S. Pat. Nos. 7,002,349 and 6,765,383. Also, telluric currents produce charge polarization effects that occur at all contrasting conductivity boundaries. Such contrasting boundaries are found to be very strong across economic deposits such as oil and gas fields and sulfide mineralization. For this reason, large and anomalous electric field responses are generated in the secondary electric fields over these deposits. The subject invention is used to measure these electric field responses.

In U.S. Pat. No. 7,002,349 to the subject inventor, a remote sensing electric field exploration survey system is disclosed and used with aircraft for shallow and deep exploration for oil and gas, mineral deposits and aquifers. The survey system uses natural electromagnetic EM fields as an energy source and includes housing pods with electric dipoles oriented in an X, Y and Z axis. The housing pods can be mounted on wing tips, a tail boom and other aircraft housing locations. The electric dipoles are connected to an angular motion detector and a total field magnetometer. An airborne data processing unit is connected to the dipoles, the motion detector and the magnetometer for storing angular motion measurements, storing low frequency magnetic measurements and measuring electric fields in a frequency range of 0.1 Hz to 3.0 Hz.

In U.S. Pat. No. 6,765,383 to the subject inventor, a magnetotelluric geophysical survey system is described using an aircraft survey bird. The survey system uses natural electromagnetic EM fields as an energy source. The system includes the survey bird with electric dipoles, an angular motion detector and an airborne data recording system.

The subject exploration survey system described herein provides a unique airborne, exploration survey system using a water sensor for wideband electric field detection for oil, gas and mineral deposit exploration along with aquifer detection not disclosed in the above mentioned patents.

SUMMARY OF THE INVENTION

A primary object of the subject invention is to provide a unique airborne, non-contact electric field technique for shallow and deep exploration and recording electric fields generated in the ground by the flow of telluric currents.

Another object of the invention is provide an airborne survey system that can explore for oil and gas, mineral deposits and aquifers with penetration from near surface down to depths of 20,000 feet and greater.

Still another object of the airborne survey system is it can operate at a fraction of the cost and for less weight when compared to other airborne survey systems that employ large, heavy and costly transmitters. Also, the system operates with very low power consumption. The survey system can easily be adapted for mounting on small fixed wing aircraft, in a towed aircraft bird and on an unmanned airborne vehicle (UAV).

A further object of the invention is the used of a water sensor having a water container having a diameter comparable to a length of the container so that the sensor's response to electric fields is substantially independent of the orientation of the electric fields with respect to the container.

The exploration system includes at least one non-directional, wideband, total electric field, water sensor. The water sensor includes a water container filled with water and adapted for mounting on an aircraft. The water container has a pair of conductive metal bands mounted around opposite ends thereof. The metal bands provide a capacitive electrical coupling with the water in the container. The water container has a diameter that is similar to the length of the container. Therefore, the sensor responds to an electric field that is substantially independent of the orientation of the field with respect to the sensor. The bands are electrically connected to a computer data processing unit mounted in the aircraft. The data processing unit is used or receiving and processing anomalous amplitudes in electric field data from the water sensor when flying over a potential oil, gas or mineral prospect as compared with adjacent response from background areas.

These and other objects of the present invention will become apparent to those familiar with airborne geophysical survey systems when reviewing the following detailed description, showing novel construction, combination and elements as described herein, and more particularly defined by the claims, it being understood that changes in the embodiments in the disclosed invention are meant to be included as coming within the scope of the claims, except insofar as they may be precluded by the prior art.

DESCRIPTION OF THE PREFERRED EMBODIMENTS

Figure 1:
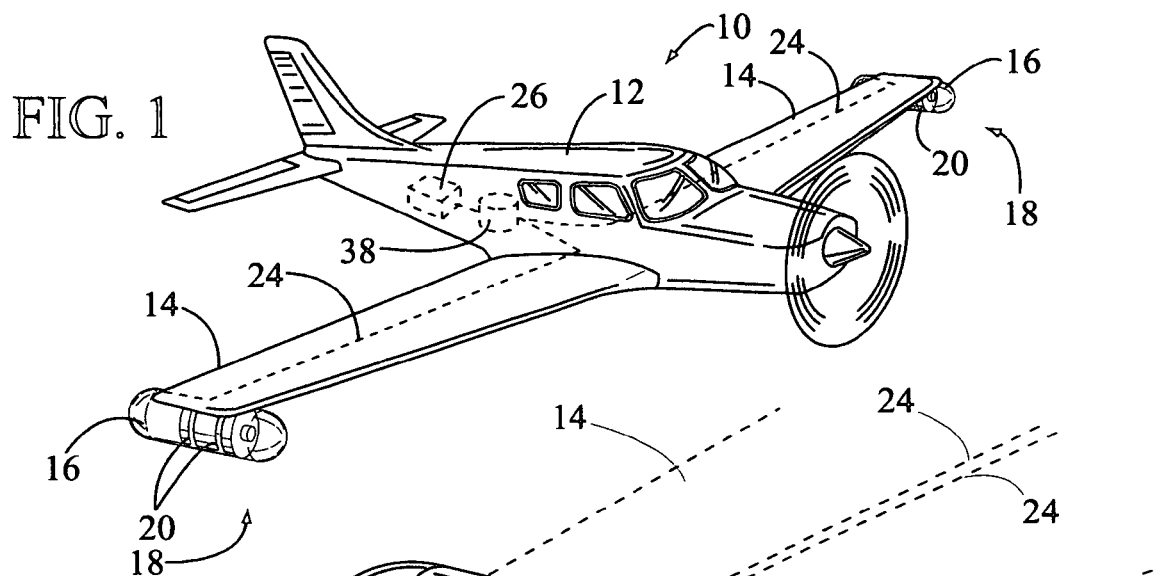
FIG. 1 illustrates a perspective view of the subject airborne exploration system installed in a fixed wing aircraft and carrying water sensors in two aerodynamic wing pods mounted on the aircraft's wing tips.

In FIG. 1, a perspective view of the subject airborne exploration system is shown having a general reference numeral 10. In this example, the exploration system 10 is mounted on a fixed wing aircraft 12. The aircraft 12 carries on each wing tip 14 an aerodynamic housing pod 16. Mounted in each of the housing pods 16 is a non-directional, wideband, total electric, water sensor, having general reference numeral 18. Each of the water sensors 18 includes a water container 20 filled with water. The housing pod 16 is made to minimize drag and the impact of charged dust particles on the surface of the container 20 mounting on an aircraft.

Figure 2:
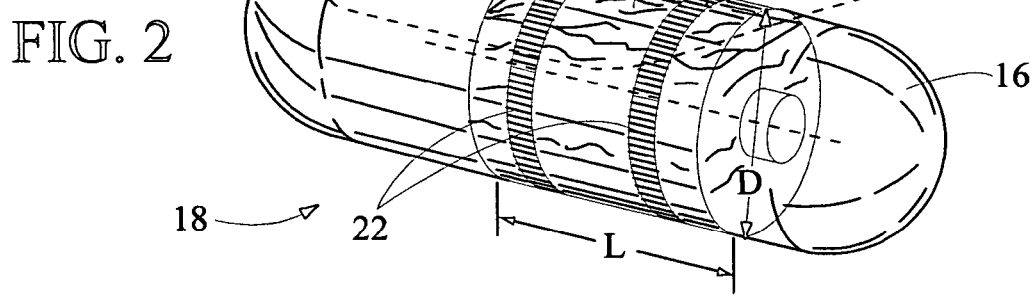
FIG. 2 is an enlarged perspective view illustrating one of the water sensors mounted in a wing pod. The water sensor includes a water container having a diameter substantially the same size as a length of the container for responding to an electric field independently of an orientation of the electric field.

In FIG. 2, an enlarged perspective view of one of the water sensors 18 is shown with the water container 20 having a pair of conductive metal bands 22 mounted around its opposite ends. The metal bands 22 provide a capacitive electrical coupling with the water in the container 20. The water container 20 has a diameter "D" substantial the size as a length "L" of the container. Therefore, the sensor 18 responds to an electric field independent of the orientation of the field. The bands 22 are electrically connected via leads 24 to a computer data processing unit 26 mounted in a rear of the aircraft 12. The data processing unit 26, as shown in FIG. 1, is used for receiving and processing electric field data from the water sensors 18 when flying over a potential oil, gas or mineral prospect.

It should be mentioned that the water sensors 18, shown in FIGS. 1 and 2, have a minimal sensitivity to minor angular motions by the aircraft 12 and the system 10 measures total electric fields without the use of a motion detector or a magnetometer. The effectiveness of this type of exploration system depends upon a very high dielectric constant of the water in the water container 20.

Figure 3:
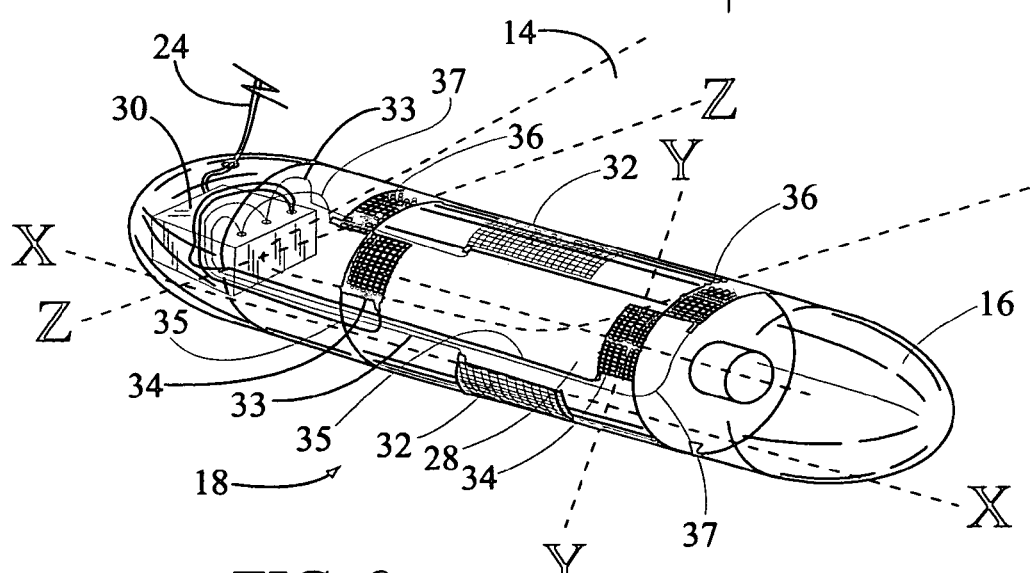
FIG. 3 is an enlarged perspective view illustrating another embodiment of the water sensor mounted on a wing pod. In this example, the water sensor includes a water container having three orthogonal electric dipoles and electrically connected to a 3-axis angular motion detector installed in a rear of the wing pod.

In FIG. 3, an enlarged perspective view of another embodiment of the water sensor 18 is shown and mounted in one of the housing pods 16. In this example, the water sensor 18 includes an elongated water container 28 electrically connected to a 3-axis angular motion detector 30 installed in a rear of the housing pod 16. The water sensor 18 can be mounted in both of the housing pods 16 shown in FIG. 1. The water container 28 includes three orthogonal dipoles 32, 34 and 36. The water sensor 18 measures the electric field components in three mutually perpendicular directions. The first dipole 32 is oriented along a horizontal X-axis parallel to the length of the aircraft 12 and connected to the motion detector 30 via leads 33. The second dipole 34 is oriented along a vertical Y-axis perpendicular to the flight direction and connected to the motion detector via leads 35. The third dipole 36 is oriented along a horizontal Z-axis perpendicular to the flight direction and connected to the motion detector via leads 37.

The motion detector 30 is based on the use of vibrating quartz tuning forks and has an angular sensitivity of 0.003 degrees. The motion detector is fully adequate for use in compensating for noise produced by the angular motion of the water sensor 18 in the presence of a static vertical electric field between the earth and the ionosphere along with air turbulence during flight. Also, the motion detector 30 is attached electrically to the data processing unit 26 via electric leads 24.

In should be mentioned that lower natural field frequencies, termed magnetotelluric (MT) fields, cover a typical range of 0.01 Hz to 3 Hz. The MT fields originate from an interaction between the solar wind and the outer reaches of the earth's magnetic field into space. The field strength of these fields increases by factor of 100 times from 1 Hz down to 0.1 Hz and about 1000 times down to 0.05 Hz. These very strong and extremely low frequency fields can provide penetrations down to 20,000 feet and deeper in the earth, which makes them uniquely effective for oil and gas exploration as well as for deep ore bodies.

An optically pumped cesium vapor magnetometer 38, shown in dashed lines in FIG. 1, is mounted in the rear of the aircraft 12 and electrically connected to the motion detectors 30 in the housing pods 16, via electric leads 24. Also, the magnetometer 38 can be connected to the water sensor 18, shown in FIG. 2, and used independently of the motion detectors 30 used with the water sensor 18 shown in FIG. 3. The magnetometer 28 has a sensitivity of 1 picoTesla and provides a very sensitive measurement of the magnetotelluric MT fields. However, the sensitivity of the magnetometer 38 lies in a direction of the earth's magnetic field. Therefore, the MT frequency measurements are made in this direction. But, the derivative of the output of the magnetometer 38 provides data that is proportional to a horizontal gradient of the MT fields. The use of the optically pumped magnetometer 38 in the subject exploration system 10 has two important applications. The first is the magnetometer's immunity to noise from angular motions encountered during flight and secondly it has high sensitivity and stability. The output of the magnetometer is recorded simultaneously with the electric field responses as detected by the water sensor. Also, the output of the magnetometer 38 is connected to the data processing unit 26 and is used in conjunction with a similar a second magnetometer placed on the ground at a central base station. The central base station is not shown in the drawings. The base station is typically not more than 20 miles from the exploration survey area and includes associated recording equipment and a GPS time and location reference for synchronization of electric field data and EM magnetic field data measurements received from said airborne data processing unit. Also, the output from the magnetometers 38 can be filtered and synchronized using the GPS time and location reference signals.

The data processing unit 26 is used for gathering and storing data and processing the data by computer upon completion of the flight. Also, the data processing unit is electrically connected to electric dipoles 32, 34 and 36 for receiving and storing electric field data measurements and connected to the motion detectors 26 in the housing pods 16 for receiving and storing angular motion measurements.

Figure 4:
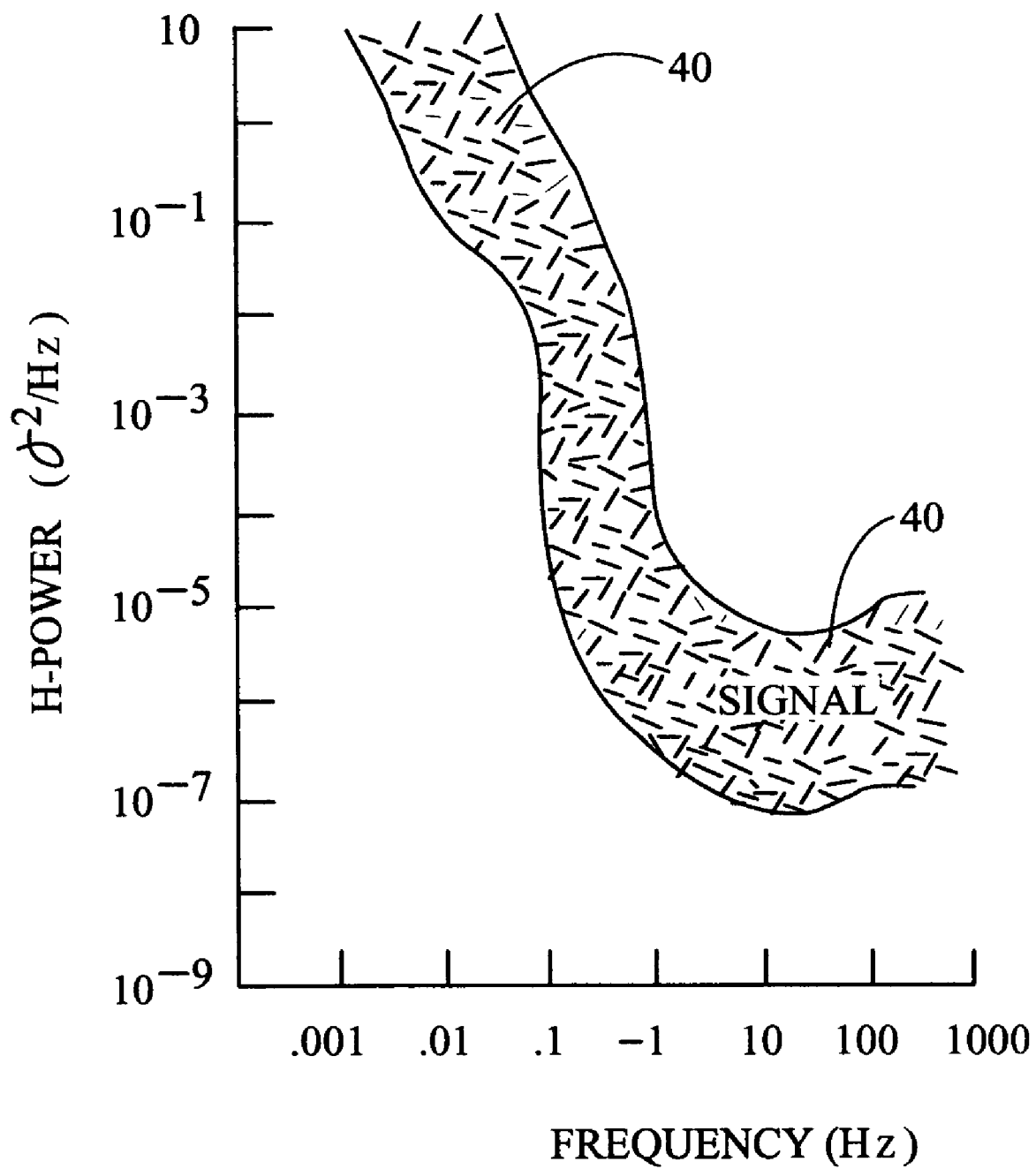
FIG. 4 is a graph illustrating electric natural field amplitudes generated in the ground and enhanced by the presents of water.

In FIG. 4, a graph is shown illustrating electric natural field amplitudes generated in the ground and enhanced by the presences of water. As mentioned above, the subject airborne exploration system 10 depends upon the presence within the earth's crust of high amplitude, low frequency, telluric currents that flow down to depths of 20,000 feet and deeper. These currents are induced in the earth by similar high amplitude, low frequency, magnetotelluric fields. Such telluric currents originate from interaction between charged particles in the solar wind with the earth's magnetic fields.

In this drawing, a power spectrum signal 40 of these magnetotelluric fields is illustrated. It should be noted that in this diagram, the ultra-low frequencies, such as 0.1 Hz and below, increase in amplitudes by orders of magnitude. These very strong fields induce deeply flowing telluric currents within the earth. The telluric currents generate charged electrical distributions at all contact zones between materials having contrasting conductivities. In addition, when water is present at these contact zones, it has an effect of strongly amplifying the electrical charges because of it's high dielectric constant of 70.

Such high contrasting conductivities are particularly strong within oil and gas reservoirs and mineral deposits. In oil and gas fields, bubbles have resistivity contrast that are orders of magnitude higher than surrounding earth materials. Also, ground water is invariably present in oil and gas reservoirs and the charges developed on gas/water or oil/water contacts are further amplified by the high dielectric constant of water. For this reason, oil and gas reservoirs are associated with very strong electric charge distributions leading to the development of anomalous electric field responses. These effects also occur in vertical leakage plumes above oil and gas reservoirs, which ascend all the way up to the surface and generate very strong electric field responses. The combination of reservoir and vertical plume effects provide very satisfactory identification that is substantially unique.

Also, such vertical plume effects can be rapidly identified by the use of Fast Fourier Transforms (FFT) multi-frequency processing using the data processing unit 26. In the processing of the airborne data, short segments, such as 10 second durations, are converted into FFT's. This is a convenient approach that is independent of a mean amplitude of the data and is responsive only to a frequency versus amplitude characteristics. These FFT's are modified substantially above oil and gas reservoirs and their associated vertical plumes. The deep lower frequency electric field responses are derived from well below the normal water table where there exists very large dielectric and conductivity contrasts between the surrounding ground water and hydrocarbons within the vertical hydrocarbon leakage plumes. This contrast is further enhanced in the vicinity of the hydrocarbon reservoir source of these plumes. The lower frequencies penetrate right down to these sources. Thus FFT responses acquired at intervals, such as 10 seconds, can provide very clear indications of the presence of oil and gas reservoirs and their plumes. This is regardless of the amplitude of the natural fields, which is a useful feature of the FFT processing. There will be a strong FFT signature contrast between the data collected in background areas when compared to data collected over reservoirs and their vertical plumes. Similar but less pronounced plume effects occur within and above hydrothermal ore deposits. These plumes are also associated with highly contrasting distributions of mixed resistivity, conductivity and related aqueous dielectric effects.

It should be further noted that all of the above expressions of electric signals 40 increase rapidly in amplitude at frequencies of 1 Hz and lower due to corresponding increases in amplitude of the telluric currents. The subject airborne exploration system 10 can clearly detect these effects of high contrast when using the water sensors 18 for detecting electric fields in a frequency bandwidth of 40 Hz down to 0.01 Hz. This bandwidth is appropriate for airborne survey usage and avoids power line effects. Strong electric field anomalies occur over both oil and gas fields as well as over mineral deposits. At the frequencies employed of 0.01 Hz up to 40 Hz, penetrations can extend down to 20,000 feet and greater. The type of geology of the exploration area can be used to differentiate between accumulations of hydrocarbons versus minerals.

While the invention has been particularly shown, described and illustrated in detail with reference to the preferred embodiments and modifications thereof, it should be understood by those skilled in the art that equivalent changes in form and detail may be made without departing from the true spirit and scope of the invention as claimed except as precluded by the prior art.

The embodiments of the invention for which as exclusive privilege and property right is claimed are defined as follows:

1. An airborne exploration survey system for exploration of oil and gas and mineral deposits, the survey system using natural electromagnetic fields as an energy source, the survey system mounted on an aircraft, the system comprising:

at least one aerodynamic housing pod adapted for mounting on the aircraft;

a water sensor for detecting electric fields mounted in said housing pod, said water sensor including a water container with water therein, said water container including a pair of conductive bands thereon; and a data processing unit adapted for mounting in the aircraft and electrically connected to said conductive bands for receiving and storing electric field data measurements.

2. The survey system as described in claim 1 wherein said water container has a diameter "D" substantially the same size as a length "L" of said water container.

3. The survey system as described in claim 1 further including a pair of housing pods adapted for mounting on the aircraft and a pair of water sensors mounted therein, said water sensors each including a water container with a pair of conductive bands thereon, said data processing unit electrically connected to said conductive bands.

4. The survey system as described in claim 1 further including a first magnetometer mounted in the aircraft, said first magnetometer electrically connected to said conductive bands on said water container and said data processing unit, an output of said first magnetometer recorded simultaneously with the electric field responses as detected by said water sensor.

5. The survey system as described in claim 4 further including a ground base station having a second magnetometer, associated recording equipment and a GPS time and location reference for synchronization of electric and EM magnetic field data measurements received from said data processing unit.

6. The survey system as described in claim 1 wherein said data processing unit includes a use of Fast Fourier Transforms (FFT) multi-frequency processing for processing electric field data in short 10 second segments.

7. An airborne exploration survey system for exploration of oil and gas and mineral deposits, the survey system using natural electromagnetic fields as an energy source, the survey system mounted on an aircraft, the system comprising:

a pair of aerodynamic housing pods adapted for mounting on wing tips of the aircraft;

a water sensor mounted in each of said housing pods, said water sensor including a water container with water therein, said water container including a pair of conductive bands thereon; and a data processing unit mounted in the aircraft and electrically connected to said conductive bands for receiving and storing electric field data measurements.

8. The survey system as described in claim 7 wherein said water containers have a diameter "D" substantially the same size as a length "L" of said water container.

9. The survey system as described in claim 7 further including a first magnetometer mounted in the aircraft, said first magnetometer electrically connected to said conductive bands on said water containers and connected to said data processing unit for simultaneously recording electric field data from said water containers.

10. The survey system as described in claim 9 further including a ground base station having a second magnetometer, associated recording equipment and a GPS time and location reference for synchronization of electric and EM magnetic field data measurements received from said data processing unit.

11. An airborne exploration survey system for exploration of oil and gas and mineral deposits, the survey system using natural electromagnetic fields as an energy source, the survey system mounted on an aircraft, the system comprising:
- at least one aerodynamic housing pod adapted for mounting on the aircraft;
- a water sensor mounted in said housing pod, said water sensor including a water container, said water container having electric dipoles mounted thereon, said electric dipoles measuring electric fields in a frequency range from 0.01 Hz. to 40 Hz.;
- an angular motion detector mounted inside said housing pod and connected to said electric dipoles for compensating for errors caused by angular motion of the aircraft when in the presence of strong electric field gradients;
- a first magnetometer mounted inside the aircraft for measuring low frequency electromagnetic gradients, said magnetometer connected to said motion detector, and
- an airborne data processing unit mounted in the aircraft and connected to said electric dipoles for receiving and storing electric field data measurements, said data processing unit also connected to said angular motion detector for receiving and storing angular motion measurements simultaneously with said magnetometer magnetic field measurements.

12. The survey system as described in claim 11 wherein said electric dipoles include a first dipole for taking data measurements in a horizontal X axis parallel to a length of the aircraft, a second dipole for taking data measurements in a vertical Y axis perpendicular to the length of the aircraft and a third dipole for taking data measurements in a horizontal Z axis perpendicular to the length of the aircraft.

13. The survey system as described in claim 11 further including a ground base station having a second magnetometer, associated recording equipment and a GPS time and location reference for synchronization of both electric and EM magnetic field data measurements as acquired by said airborne data processing unit.

* * * * *